Oct. 7, 1930.  R. C. HAWKINS  1,777,563
LUG ATTACHMENT FOR TRACTOR WHEELS
Filed May 21, 1927

INVENTOR.
ROE C. HAWKINS.
BY
H. A. Dreckman
ATTORNEY.

Patented Oct. 7, 1930

1,777,563

UNITED STATES PATENT OFFICE

ROE C. HAWKINS, OF LONG BEACH, CALIFORNIA

LUG ATTACHMENT FOR TRACTOR WHEELS

Application filed May 21, 1927. Serial No. 193,347.

An object of my invention is to provide a lug attachment for tractor wheels which may be quickly and easily mounted on the wheel by securing the lug to the wheel cleats, which cleats are standard equipment on well-known tractors, such as the Fordson.

Another object is to provide a lug attachment which, when secured to the cleat will serve to reinforce the same.

A further object is to provide a lug which is mounted at the end of the cleat and so positioned that the pressure face of the lug is at right angles to the edge of the wheel.

A still further object is to provide a lug which is simple in construction, inexpensive to manufacture, and effective in operation.

Other objects, advantages, and features of invention may appear from the accompanying drawing, the subjoined detailed description, and the appended claims.

Figure 1:
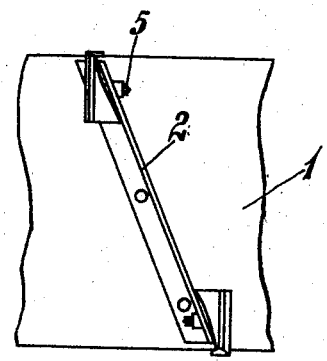
Fig. 1 is a fragmentary plan view of a tractor wheel with my lugs secured thereto.
Figure 2:
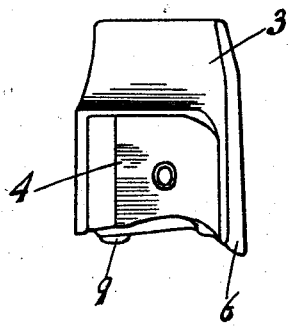
Fig. 2 is a perspective view of one of the lugs.

Referring more particularly to the drawing:

The tractor wheel 1 is provided with a plurality of diagonally extending cleats 2, which cleats are suitably secured to the wheel. My lugs 3 are each provided with an angularly extending recess 4 into which the outer end of a cleat is adapted to extend. As previously stated the cleats 2 are set diagonally across the wheel and in order that the lugs 3 may be positioned at right angles to the edge of the wheel, it is necessary that the recesses 4 extend at an angle into the lug. A single bolt 5 extends through the cleat 2 and lug 3 to hold said lug securely in position.

My lugs are so arranged that they fit over the ends of the cleats as previously stated, and a lip 6 is provided on the outer edge of each lug, which lip extends over the edge of the wheel 1, thus assisting in holding the lug against movement. The lugs are so arranged that they may be positioned at either end of the cleat 2; that is, it is not necessary to make a right and a left lug for each wheel.

Figure 3:
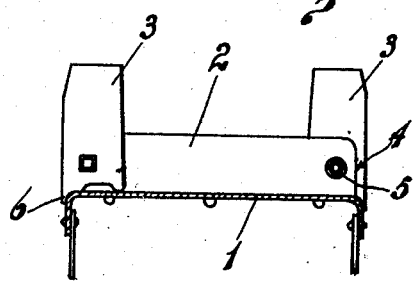
Fig. 3 is a fragmentary transverse view of the tractor wheel showing my lugs secured thereto.
Figure 4:
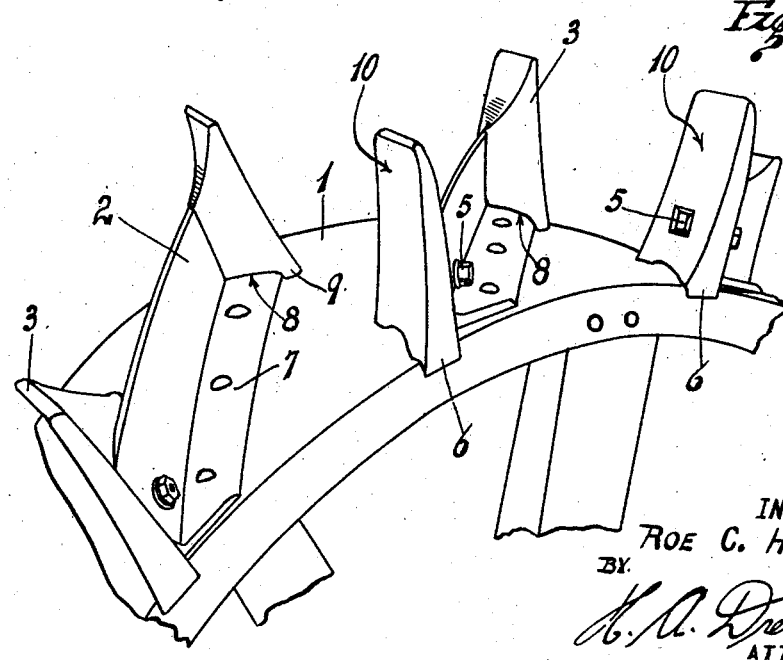
Fig. 4 is a perspective view of a fragment of a tractor wheel with my lugs mounted thereon.

As shown in Figs. 1, 3 and 4, the lugs are positioned on opposite sides of the cleat 2 thus serving to reinforce the cleat and also to remove considerable of the strain therefrom during the operation of the tractor. The arrangement of my lug is very simple and it may be readily cast with a simple pattern, thus reducing the cost of manufacture of the same.

The cleat 2 is provided with a flange 7 and the lugs 3 are notched, as at 8, to fit over said flange, and a foot 9 extends beyond the flange and bears against the surface of the wheel to further strengthen the lug. It will be seen that by my method of mounting, the operating face 10 of the lug is at right angles to the edge of the wheel, but is secured to a diagonally extending cleat as previously stated. Thus I provide a lug which is very effective in its operation and which will enter and move out of the soil with a minimum of effort and without clogging.

Having described my invention, I claim:

1. In combination with a tractor wheel and a diagonally extending cleat on said wheel, a flange on the cleat, a lug, said lug having a recess therein into which the end of the cleat extends, said lug being positioned on either side of the cleat, a bolt extending through said cleat and lug, a finger on the lug adapted to extend over the edge of the wheel, a notch formed in the lug adapted to accommodate the flang of the cleat, and a foot on the lug adapted to bear against the face of the wheel.

2. In combination with a tractor wheel and a diagonally extending cleat on said wheel, a flange on the cleat, a lug attachment adapted to be positioned against the ends of and on either side of said cleat, said lug having a recess therein to receive the end of said cleat, a single bolt extending through said cleat and lug, a notch formed in the lug to accommodate the flange of the cleat, and a foot on the lug adapted to bear against the face of the wheel.

3. In combination with a diagonally extending cleat on a tractor wheel, a traction lug having therein a recess into which one end of said cleat extends, this end of the cleat abutting a portion of the lug, the major portion of the lug being positioned on one side of the cleat, and a single bolt extending through the lug and the cleat to hold the lug in operative position.

In testimony whereof, I affix my signature.

ROE C. HAWKINS.